US010288291B2

(12) United States Patent
Monahan et al.

(10) Patent No.: US 10,288,291 B2
(45) Date of Patent: May 14, 2019

(54) AIR-SHIELDED FUEL INJECTION ASSEMBLY TO FACILITATE REDUCED $NO_x$ EMISSIONS IN A COMBUSTOR SYSTEM

(71) Applicant: General Electric Company, Schenectady, NY (US)

(72) Inventors: Sarah Marie Monahan, Latham, NY (US); Joel Meier Haynes, Niskayuna, NY (US); Narendra Digamber Joshi, Schenectady, NY (US); David James Walker, Burnt Hills, NY (US); Junwoo Lim, Niskayuna, NY (US); Krishna Kumar Venkatesan, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1089 days.

(21) Appl. No.: 14/461,069

(22) Filed: Aug. 15, 2014

(65) Prior Publication Data
US 2016/0363319 A1 Dec. 15, 2016

(51) Int. Cl.
*F23R 3/28* (2006.01)
*F02C 7/22* (2006.01)
*F23D 14/64* (2006.01)

(52) U.S. Cl.
CPC ............ *F23R 3/286* (2013.01); *F02C 7/222* (2013.01); *F23D 14/64* (2013.01);
(Continued)

(58) Field of Classification Search
CPC .. F02C 7/22; F02C 7/222; F02C 2900/07001; F05D 2240/36; F23R 3/30; F23R 3/28; F23R 3/286; F23D 14/64
See application file for complete search history.

(56) References Cited

U.S. PATENT DOCUMENTS 2,551,538 A * 5/1951 Hensel .................. B05B 7/065
239/379
4,070,826 A * 1/1978 Stenger .................. F02C 7/222
239/425
(Continued)

FOREIGN PATENT DOCUMENTS

FR 2879672 A1 6/2006
RU 2439435 C1 1/2012

OTHER PUBLICATIONS

Gopalakrishnan, P., M. K. Bobba, A. Radhakrishnan, Y. Neumeier, and J. M. Seitzman. "Characterization of the Reacting Flowfield in a Liquid-Fueled Stagnation Point Reverse Flow Combustor." 45th AIAA Aerospace Sciences Meeting and Exhibit AIAA-2007-0172 (2007): 1-9. Print.

*Primary Examiner* — Carlos A Rivera
(74) *Attorney, Agent, or Firm* — GE Global Patent Operation; Nitin Joshi (57) ABSTRACT

An air-shielded fuel injection assembly for use in a combustion chamber of a turbine assembly. The air-shielded fuel injection assembly generally includes a fuel manifold including a plurality of fuel injection ports and an air manifold including a plurality of air injection ports. Each of the plurality of fuel injection ports is configured to introduce a fuel column into an annular cavity of a mixer assembly. Each of the plurality of air injection ports is configured to introduce an air curtain about an associated fuel injection column to minimize recirculation upstream of the fuel injection column and increase penetration of the fuel injection column into the cavity. Also disclosed are a mixer assembly and a turbine assembly including the air-shielded fuel injection assembly.

14 Claims, 6 Drawing Sheets

(52) U.S. Cl.
CPC ...... *F05D 2240/35* (2013.01); *F05D 2240/36* (2013.01); *F23D 2206/10* (2013.01); *F23D 2900/11002* (2013.01)

(56) References Cited

U.S. PATENT DOCUMENTS

| | | | | |
|---|---|---|---|---|
| 4,854,127 | A * | 8/1989 | Vinson | F23C 7/002 239/424.5 |
| 5,403,181 | A | 4/1995 | Tanaka et al. | |
| 5,435,884 | A | 7/1995 | Simmons et al. | |
| 5,487,659 | A * | 1/1996 | Eroglu | F23D 11/101 431/12 |
| 5,675,971 | A * | 10/1997 | Angel | F23R 3/286 239/405 |
| 5,680,766 | A * | 10/1997 | Joshi | F23C 7/004 239/405 |
| 5,761,906 | A | 6/1998 | Norster | |
| 6,141,967 | A * | 11/2000 | Angel | F23R 3/14 239/405 |
| 6,381,964 | B1 * | 5/2002 | Pritchard, Jr. | F23R 3/14 60/746 |
| 6,415,594 | B1 * | 7/2002 | Durbin | F23R 3/286 60/748 |
| 6,539,721 | B2 | 4/2003 | Oikawa et al. | |
| 7,581,396 | B2 | 9/2009 | Hsieh et al. | |
| 8,146,837 | B2 | 4/2012 | Thomson et al. | |
| 8,181,464 | B2 * | 5/2012 | Wilbraham | F23C 7/004 239/399 |
| 8,549,859 | B2 | 10/2013 | Fox et al. | |
| 8,943,831 | B2 * | 2/2015 | Eroglu | F23R 3/36 239/422 |
| 9,534,788 | B2 * | 1/2017 | Li | F23R 3/14 |
| 2010/0300102 | A1 * | 12/2010 | Bathina | F23R 3/12 60/737 |
| 2012/0073302 | A1 * | 3/2012 | Myers | F23R 3/14 60/748 |
| 2012/0208135 | A1 * | 8/2012 | Kirzhner | F23C 9/00 431/12 |
| 2017/0122211 | A1 | 5/2017 | Zhang et al. | |

* cited by examiner

AIR-SHIELDED FUEL INJECTION ASSEMBLY TO FACILITATE REDUCED NO$_x$ EMISSIONS IN A COMBUSTOR SYSTEM

BACKGROUND

The embodiments described herein relate generally to combustion systems, and more specifically, to systems that facilitate optimal mixing of liquid and gaseous fuels with oxidizer in a turbine combustor, such as gas turbine engine or liquid fuel aero-engine.

Combustors are commonly used in industrial, power generation and aero operations to ignite fuel to produce combustion gases having a high temperature and pressure. For example, turbo-machines such as gas turbine engines or aero-engines, may include one or more combustors to generate power or thrust. A typical turbine system includes an inlet section, a compressor section, a combustion section, a turbine section, and an exhaust section. The inlet section cleans and conditions a working fluid (e.g., air) and supplies the working fluid to the compressor section. The compressor section increases the pressure of the working fluid and supplies a compressed working fluid to the combustion section. The combustion section mixes fuel with the compressed working fluid and ignites the mixture to generate combustion gases having a high temperature and pressure. The combustion gases flow to the turbine section where they expand to produce work. For example, expansion of the combustion gases in the turbine section may rotate a shaft connected to a generator to produce electricity.

The combustion section may include one or more combustors annularly arranged between the compressor section and the turbine section, and the temperature of the combustion gases directly influences the thermodynamic efficiency, design margins, and resulting emissions of the combustor. For example, higher combustion temperatures generally improve the thermodynamic efficiency of the combustor. However, higher combustion temperatures also promote flame holding conditions in which the combustion flame migrates towards the fuel being supplied by nozzles, possibly causing accelerated damage to the nozzles in a relatively short amount of time. In addition, higher combustion temperatures generally increase the disassociation rate of diatomic nitrogen, increasing the production of nitrogen oxides (NO$_x$) for the same residence time in the combustor. Conversely, a lower combustion temperature associated with reduced fuel flow and/or part load operation (turndown) generally reduces the chemical reaction rates of the combustion gases, increasing the production of carbon monoxide and unburned hydrocarbons for the same residence time in the combustor.

In a particular combustor design, the combustor may include a cap assembly that extends radially across at least a portion of the combustor, and one or more fuel nozzles may be radially arranged across the cap assembly to supply fuel to the combustor. The combustor may also include at least one annular liner that extends downstream from the cap assembly. The liner at least partially defines a combustion chamber within the combustor. The liner further defines a hot gas path that extends between the combustion chamber and an inlet to the turbine. The fuel nozzles may include swirler vanes and/or other flow guides to enhance mixing between the fuel and the compressed working fluid to produce a lean fuel-air mixture for combustion. The swirling fuel-air mixture flows into the combustion chamber where it ignites to generate the hot combustion gases. The hot combustion gases are routed through the hot gas path to the inlet of the turbine.

Although generally effective at enabling higher operating temperatures, the overall effectiveness of the engine is at least partially dependent upon how well the fuel-air combination that flows from the injector mixes with the swirling fuel-air mixture in the combustion chamber and/or with the hot combustion gases flowing through the liner generally downstream from the combustion chamber. For example, enhanced mixing of the fuel-air combination from the injector with the swirling fuel-air mixture in the combustion chamber and/or with the hot combustion gases flowing through the liner reduces peak flame temperature within the combustor, thereby reducing NO$_x$ levels.

As a result, an improved system for supplying fuel to a combustor that enhances mixing of the fuel-air combination that flows from the fuel injectors would be useful.

BRIEF DESCRIPTION OF THE DISCLOSURE

Aspects and advantages of the disclosure are set forth below in the following description, or may be obvious from the description, or may be learned through practice of the disclosure.

In one aspect, an air-shielded fuel injector assembly for use in a combustion chamber of a turbine engine is provided. The air-shielded fuel injector assembly including a fuel manifold having a plurality of fuel injection ports and an air manifold having a plurality of air injection ports. Each fuel injection port is configured to introduce a fuel column into an annular cavity of a mixer assembly. Each air injection port is configured to introduce an air curtain to minimize recirculation upstream of the fuel injection column and increase penetration of the fuel injection column into the cavity.

In another aspect, a mixer assembly for use in a combustion chamber of a turbine engine assembly is provided. The mixer assembly including a mixer having a main housing and defining an annular cavity, an air-shielded fuel injection assembly in fluid communication with the annular cavity and a swirler positioned upstream from the air-shielded fuel injection assembly. The air-shielded fuel injection assembly including a plurality of fuel injection ports and a plurality of air injection ports. Each fuel injection port is configured to introduce a fuel column into the annular cavity. Each air injection port is configured to introduce one of an upstream air curtain or a downstream air curtain relative to an associated fuel injection column. The swirler is positioned upstream from the air-shielded fuel injection assembly and includes a plurality of vanes for swirling air traveling through the swirler to mix air and the one of an upstream air curtain or a downstream air curtain and the associated fuel injection column.

In yet another aspect, a turbine engine assembly is provided. The turbine engine assembly including a compressor section, a combustor section and a turbine section configured in a downstream axial flow relationship. The combustor section including a combustion chamber and a mixer assembly disposed in the combustion chamber. The mixer assembly including a mixer having a main housing and defining an annular cavity, an air-shielded fuel injection assembly in fluid communication with the annular cavity and a swirler positioned upstream from the air-shielded fuel injection assembly. The air-shielded fuel injection assembly including a plurality of fuel injection ports and a plurality of air injection ports. Each fuel injection port is configured to introduce a fuel column into the annular cavity. Each air injection port is configured to introduce one of an upstream air curtain or a downstream air curtain relative to an associated fuel injection column introduced by an associated fuel injection port of the plurality of fuel injection ports. The swirler is positioned upstream from the air-shielded fuel injection assembly and includes a plurality of vanes for swirling air traveling through the swirler to mix air, and the air curtain and the associated fuel injection column dispensed by the plurality of fuel injection ports and the plurality of air injection ports.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

Corresponding reference characters indicate corresponding parts throughout the several views of the drawings.

DETAILED DESCRIPTION OF THE DISCLOSURE

The exemplary methods and systems described herein overcome the structural disadvantages of known fuel injectors by providing optimal mixing of liquid and gaseous fuels with oxidizer in the combustor. It should also be appreciated that the term "first end" is used throughout this application to refer to directions and orientations located upstream in an overall axial flow direction of fluids with respect to a center longitudinal axis of a combustion chamber. It should be appreciated that the terms "axial" and "axially" are used throughout this application to refer to directions and orientations extending substantially parallel to a center longitudinal axis of a combustion chamber. It should also be appreciated that the terms "radial" and "radially" are used throughout this application to refer to directions and orientations extending substantially perpendicular to a center longitudinal axis of the combustion chamber. It should also be appreciated that the terms "upstream" and "downstream" are used throughout this application to refer to directions and orientations located in an overall axial flow direction with respect to the center longitudinal axis of the combustion chamber.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a fuel injector assembly for a combustor incorporated into a gas turbine for purposes of illustration, one of ordinary skill in the art will readily appreciate that embodiments of the present disclosure may be applied to any combustor assembly incorporated into any turbomachine, and not limited to gas turbine engines.

Figure 1:
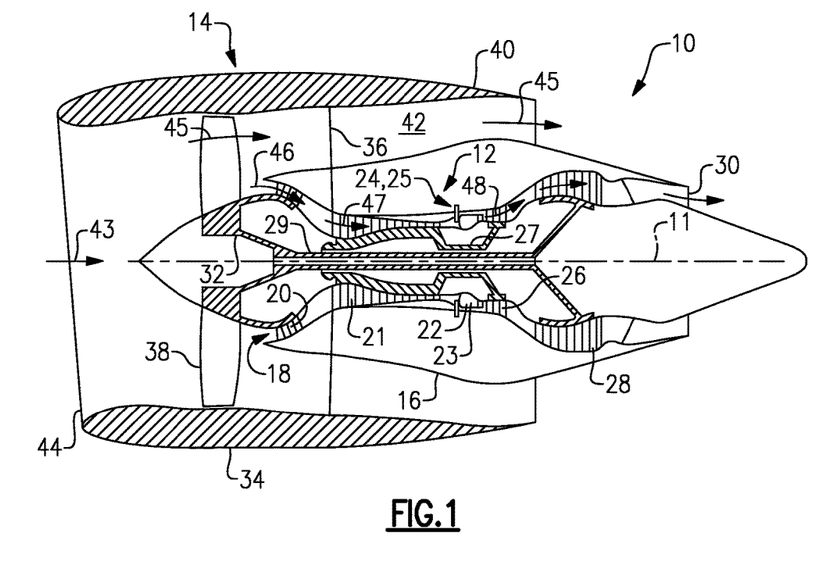
FIG. 1 is schematic diagram of an exemplary turbine engine assembly including a combustion section, according to one or more embodiments disclosed herein.

Referring now to the drawings, wherein identical numerals indicate the same elements throughout the figures, FIG. 1 provides a diagram of an exemplary turbine engine assembly 10 that may incorporate various embodiments of the present disclosure. As described in detail below, the disclosed turbine engine assembly 10 (e.g., a gas turbine engine, a liquid fueled aero-engine, etc.) may employ one or more mixer assemblies (described presently), including one or more fuel nozzles (e.g., turbine fuel nozzles) with an improved design for fuel injection to enhance premixing of the fuel, and control over the fuel-air profile, while reducing emissions (e.g., $NO_x$) in the turbine engine assembly 10.

FIG. 1 depicts in diagrammatic form an exemplary turbine engine assembly 10 (high bypass type engine) utilized with aircraft having a longitudinal or axial centerline axis 11 therethrough for reference purposes. Assembly 10 preferably includes a core turbine engine generally identified by numeral 12 and a fan section 14 positioned upstream thereof. Core engine 12 typically includes a generally tubular outer casing 16 that defines an annular inlet 18. Outer casing 16 further encloses and supports a booster compressor 20 for raising the pressure of the air that enters core engine 12 to a first pressure level. A high pressure, multi-stage, axial-flow high pressure compressor 21 receives pressurized air from booster 20 and further increases the pressure of the air. The pressurized air flows to a combustor 22, generally defined by a combustion liner 23, and including a mixer assembly 24, where fuel is injected into the pressurized air stream, via one or more fuel nozzles 25 to raise the temperature and energy level of the pressurized air. The high energy combustion products flow from combustor 22 to a first (high pressure) turbine 26 for driving high pressure compressor 21 through a first (high pressure) drive shaft 27, and then to a second (low pressure) turbine 28 for driving booster compressor 20 and fan section 14 through a second (low pressure) drive shaft 29 that is coaxial with first drive shaft 27. After driving each of turbines 26 and 28, the combustion products leave core engine 12 through an exhaust nozzle 30 to provide propulsive jet thrust.

Fan section 14 includes a rotatable, axial-flow fan rotor 32 that is surrounded by an annular fan casing 34. It will be appreciated that fan casing 34 is supported from core engine 12 by a plurality of substantially radially-extending, circumferentially-spaced outlet guide vanes 36. In this way, fan casing 34 encloses the fan rotor 32 and a plurality of fan rotor blades 38. A downstream section 40 of fan casing 34 extends over an outer portion of core engine 12 to define a secondary, or bypass, airflow conduit 42 that provides additional propulsive jet thrust.

From a flow standpoint, it will be appreciated that an initial air flow, represented by arrow 43, enters the turbine engine assembly 10 through an inlet 44 to fan casing 34. Air flow 43 passes through fan blades 38 and splits into a first compressed air flow (represented by arrow 45) and a second compressed air flow (represented by arrow 46) which enters booster compressor 20. The pressure of the second compressed air flow 46 is increased and enters high pressure compressor 21, as represented by arrow 47. After mixing with fuel and being combusted in combustor 22 combustion products 48 exit combustor 22 and flow through the first turbine 26. Combustion products 48 then flow through the second turbine 28 and exit the exhaust nozzle 30 to provide thrust for the turbine engine assembly 10.

During operation, the one or more fuel nozzles, in the mixer assembly 24, intake the fuel from a fuel supply (e.g., liquid and/or gas fuel), mix the fuel with air, and distribute the air-fuel mixture into the one or more combustor 22 in a suitable ratio for optimal combustion, emissions, fuel consumption, and power output. The turbine engine assembly 10 includes the mixer assembly 24 including the one or more fuel nozzles 25, including an air-shielded fuel injection assembly (described presently).

Figure 2:
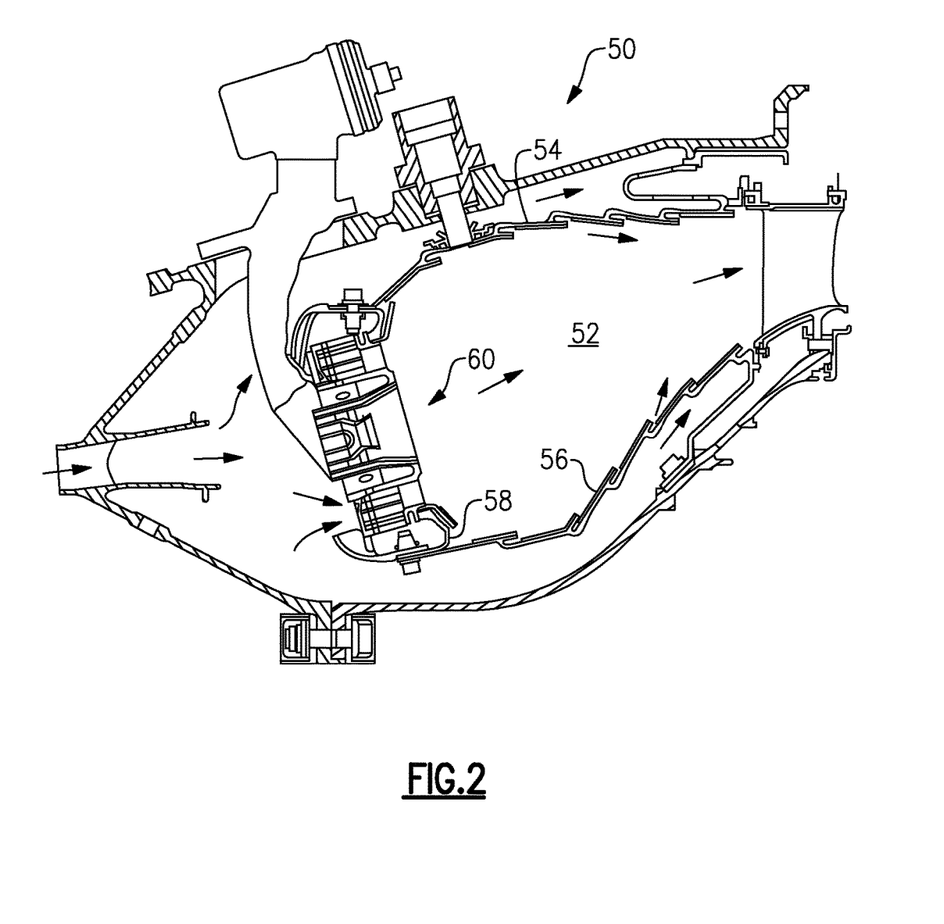
FIG. 2 is a simplified side cross-section view of a portion of an exemplary combustor, according to one or more embodiments disclosed herein.

Referring to the drawings and in particular to FIG. 2, illustrated is an exemplary combustor 50, generally similar to combustors 22 of FIG. 1. The combustor 50 includes a combustion chamber 52 in which combustor air is mixed with fuel and burned. The combustor 50 includes an outer liner 54 and an inner liner 56. The outer liner 54 defines an outer boundary of the combustion chamber 52, and the inner liner 56 defines an inner boundary of the combustion chamber 52. An annular dome, generally designated by 58, mounted upstream from the outer liner 54 and the inner liner 56 defines an upstream end of the combustion chamber 52. One or more mixer assemblies of the present invention, generally designated by 60, are positioned on the dome 58. According to this disclosure, each of the mixer assemblies 60 includes a novel air-shielded fuel injection assembly (described presently) for delivery of a mixture of fuel and air to the combustion chamber 52. Other features of the combustion chamber 52 are conventional and will not be discussed in further detail.

Figure 3:
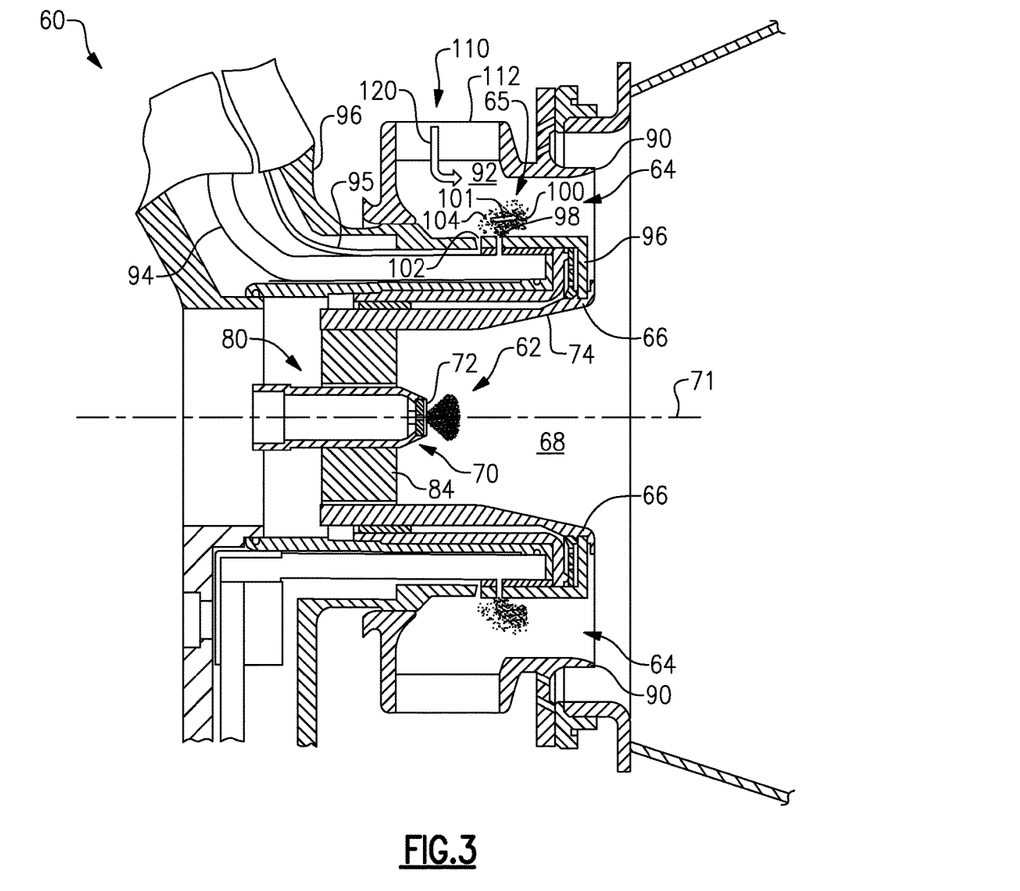
FIG. 3 is a simplified side cross-section view of a mixer assembly including an air-shielded fuel injection assembly, according to one or more embodiments disclosed herein.

Illustrated in FIG. 3 is a first embodiment of air-shielded fuel injection assembly according to the disclosure. As illustrated, each mixer assembly 60 generally comprises a pilot mixer, generally designated by 62, and a main mixer, generally designated by 64 and including the air-shielded fuel injection assembly (described presently), surrounding the pilot mixer 62. The pilot mixer 62 includes an annular pilot housing 66 having a hollow interior 68. A pilot fuel nozzle, generally designated by 70, is mounted in the annular pilot housing 66 along a centerline 71 of the mixer assembly 60. The pilot fuel nozzle 70 includes a fuel injector 72 adapted for dispensing droplets of fuel into the hollow interior 68 of the pilot housing 66. It is envisioned that the fuel injector 72 may include an injector such as described in U.S. Pat. No. 5,435,884, which is hereby incorporated by reference.

In the illustrated embodiment, the pilot mixer 62 also includes a concentrically mounted axial swirler, generally designated by 80, and having a plurality of vanes 84, positioned upstream from the pilot fuel nozzle 70. Each of the vanes 84 is skewed relative to the centerline 71 of the mixer 60 for swirling air traveling through the pilot swirler 80 so it mixes with the droplets of fuel dispensed by the pilot fuel nozzle 70 to form a fuel-air mixture selected for optimal burning during ignition and low power settings of the engine. Although the pilot mixer 62 of the disclosed embodiment has a single axial swirler 80, those skilled in the art will appreciate that the pilot mixer 62 may include more swirlers without departing from the scope of the present disclosure. As will further be appreciated by those skilled in the art, when more than one swirler is included in the pilot mixer, the swirlers may be configured having differing numbers of vanes as well as configured to swirl air in the same direction or in opposite directions. Further, the pilot interior 68 may be sized and the pilot swirler 80 airflow and swirl angle may be selected to provide good ignition characteristics, lean stability and low CO and HC emissions at low power conditions.

The housing 66 includes a generally diverging inner surface 74 adapted to provide controlled diffusion for mixing the pilot air with the main mixer airflow. The diffusion also reduces the axial velocities of air passing through the pilot mixer 62 and allows recirculation of hot gasses to stabilize the pilot flame.

The main mixer 64 includes a main housing 90 surrounding the pilot housing 66 and defining an annular cavity 92 and an air-shielded fuel injection assembly 65 in fluid communication with the annular cavity 92. The air-shielded fuel injection assembly 65 includes a fuel manifold 94 and an air manifold 95 mounted in a housing 96 between the pilot housing 66 and the main housing 90. The fuel manifold 94 has a plurality of fuel injection ports 98 for introducing a fuel column 100, comprised of droplets of fuel, into the cavity 92 of the main mixer 64. The fuel manifold 94 may have any number of fuel injection ports 98 without departing from the scope of the present disclosure. In one embodiment the fuel manifold 94 has a single circumferential row consisting of 10 evenly spaced ports. Although the ports 98 are arranged in a single circumferential row in the embodiment shown in FIG. 3, those skilled in the art will appreciate that they may be arranged in other configurations without departing from the scope of the present disclosure.

The air manifold 95 includes a plurality of air injection ports 102 for introducing an air curtain 104 about each of the fuel injection columns 100 and into the cavity 92 of the main mixer 64. In this particular embodiment, each of the plurality of air injection ports 102 is associated with one of the plurality of fuel injection ports 98 and configured upstream of the associated fuel injection port 98 to form an upstream curtain of air thereabout the fuel column 100 introduced by the associated fuel injection port 98. As used herein, the term "curtain" is used to indicate at least a partial "wrapping" of the injected air about the injected fuel column or injection of air relative to the injected fuel column in a manner so as to steer the trajectory 101 of the injected fuel droplets. As will be understood by those skilled in the art, using fuel injection ports 98 and air injection ports 102 at different axial locations along the main mixer cavity 92 so as to provide for the formation of the upstream air curtain 104 about each of the fuel injection columns 100 minimizes recirculation upstream (behind) each of the fuel injection columns 100 and increases liquid jet penetration into the cavity 92. The improved jet penetration provides reduction in fuel wall wetting near fuel injector ports 98. In addition, the formation of the upstream air curtain 104 about each of the fuel injection columns 100 provides a tunable assembly that includes the flexibility to adjust the degree of fuel-air mixing to achieve low $NO_x$ and complete combustion under variable conditions, resulting in lower emissions. In addition, the formation of the upstream air curtain 104 about each of the fuel injection columns 100 provides reduction in fuel residence time, resulting in lower likelihood of autoignition in the main mixer 64.

In an embodiment, by positioning the annular housing 96 of the fuel manifold 94 and the air manifold 95 between the pilot mixer 62 and the main mixer 64, the mixers are physically separated. As will also be appreciated by those skilled in the art, the distance between the pilot mixer 62 and the main mixer 64 may be selected to improve ignition characteristics, combustion stability at high and lower power and low CO and HC emissions at low power conditions.

The main mixer 64 also includes a swirler 110 positioned upstream from the plurality of fuel injection ports 98 and the plurality of air injection ports 102. Although the main swirler 110 may have other configurations without departing from the scope of the present disclosure, in one embodiment the main swirler is a radial swirler having a plurality of radially skewed vanes 112 for swirling air traveling through the swirler 110 to mix air passing through the swirler 110 and injected by the air injection ports 102 and the droplets of fuel dispensed by the fuel ports 98 in the annular housing 96 to form a fuel-air mixture selected for optimal burning during high power settings of the engine. Although the swirler 110 may have a different number of vanes 112 without departing from the scope of the present disclosure, in one embodiment the main swirler has 40 vanes. The main mixer 64 is primarily designed to achieve low $NO_x$ under high power conditions by operating with a lean air-fuel mixture and by maximizing the fuel and air pre-mixing via the upstream air curtain 104 about the fuel injection column 100. The radial swirler 110 of the main mixer 64 swirls the incoming air through the radial vanes 112 and establishes the basic flow field of the combustor 50 (FIG. 2). During operation, fuel droplets are injected radially outward into the swirling air stream downstream from the main swirler 110 as fuel injection column 100. The main swirler 110 in combination with the formation of the upstream air curtain 104 about the fuel injection column 100 allows for thorough mixing within the main mixer cavity 92 upstream from its exit. This swirling mixture enters the combustor chamber 52 (FIG. 2) where it is burned completely.

Figure 4:
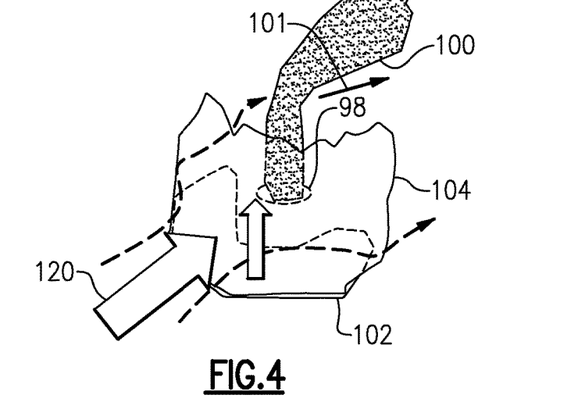
FIG. 4 is an enlarged simplified diagram illustrating the air-shielded fuel injection assembly of FIG. 3, according to one or more embodiments disclosed herein.
Figure 5:
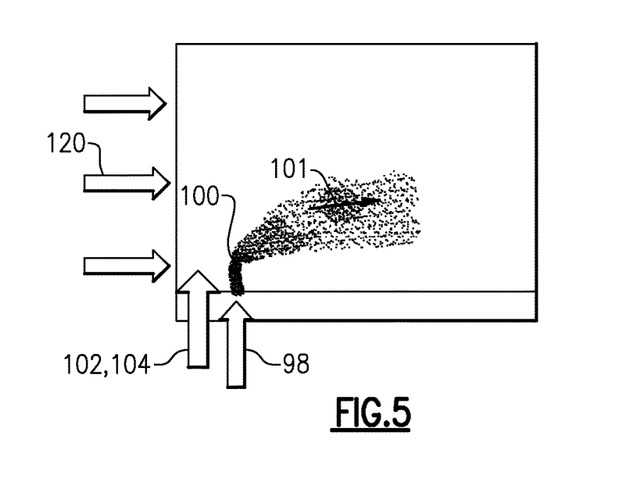
FIG. 5 provides a side diagrammatic view of the fuel injection flow pattern as a result of the air-shielded fuel injection assembly, according to one or more embodiments disclosed herein.

Referring now to FIGS. 4 and 5, illustrated in schematic illustrations, is the upstream air curtain 104 of FIG. 3 as it relates to the fuel injection column 100 and the resulting air/fuel flows. As illustrated, the upstream air curtain 104 is injected via the air injection port 102. In this particular embodiment, the air injection port 102 has a general contoured configuration as shown in FIG. 4. In an embodiment, the contoured configuration has a general "kidney bean" shape. In an alternate embodiment, the air injection port 102 may have any custom shape that provides for the injection of an air jet that serves as a shield for the liquid fuel column, and more particularly the fuel injection column 100. The shape and location of the air jet inlet, and more particularly the air injection port 102, as well as the distance between the fuel injection port 98 and the air injection port 102 may be adjusted on a case-by-case basis, provided a center of the air injection port 102 is aligned with the center of an associated fuel injection port 98 (as described presently).

Figure 6:
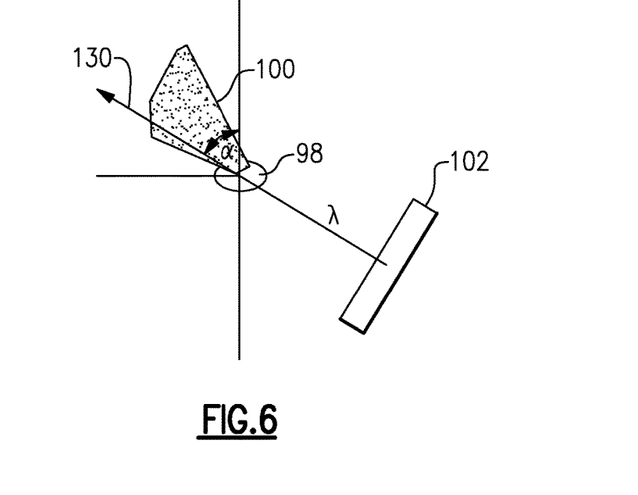
FIG. 6 is a top schematic view illustrating alignment of an air injection port and an associated fuel injection port, according to one or more embodiments disclosed herein.

Illustrated by directional arrow in FIGS. 3-5, is an upstream swirl crossflow 120. The presence of the upstream air curtain 104 about the fuel injection column 100 will increase the penetration of the liquid jet, and more particularly the fuel injection column 100, into the upstream swirl crossflow 120. A trajectory 101 of the fuel droplets in the fuel injection column 100 away from the fuel injection port 98 determine a flow angle "α" as best illustrated in FIG. 6, which shows the view from the top looking down, with the upstream-to-downstream axial direction represented from bottom to top in FIG. 6. The center of the air injection port 102, which in this particular embodiment is illustrated as rectangular in shape, and the center of the fuel injection port 98 are aligned along a vector 130 forming the flow angle "α". The area of the air injection port 102 is designed based on expected pressure drop near the air shield region, and more particularly, the upstream air curtain 104, air density and desired amount of air flow through the shield region. A distance λ between the center of the fuel injection port 98 and the air injection port 102 may be adjusted on a case-by-case basis.

Figure 7:
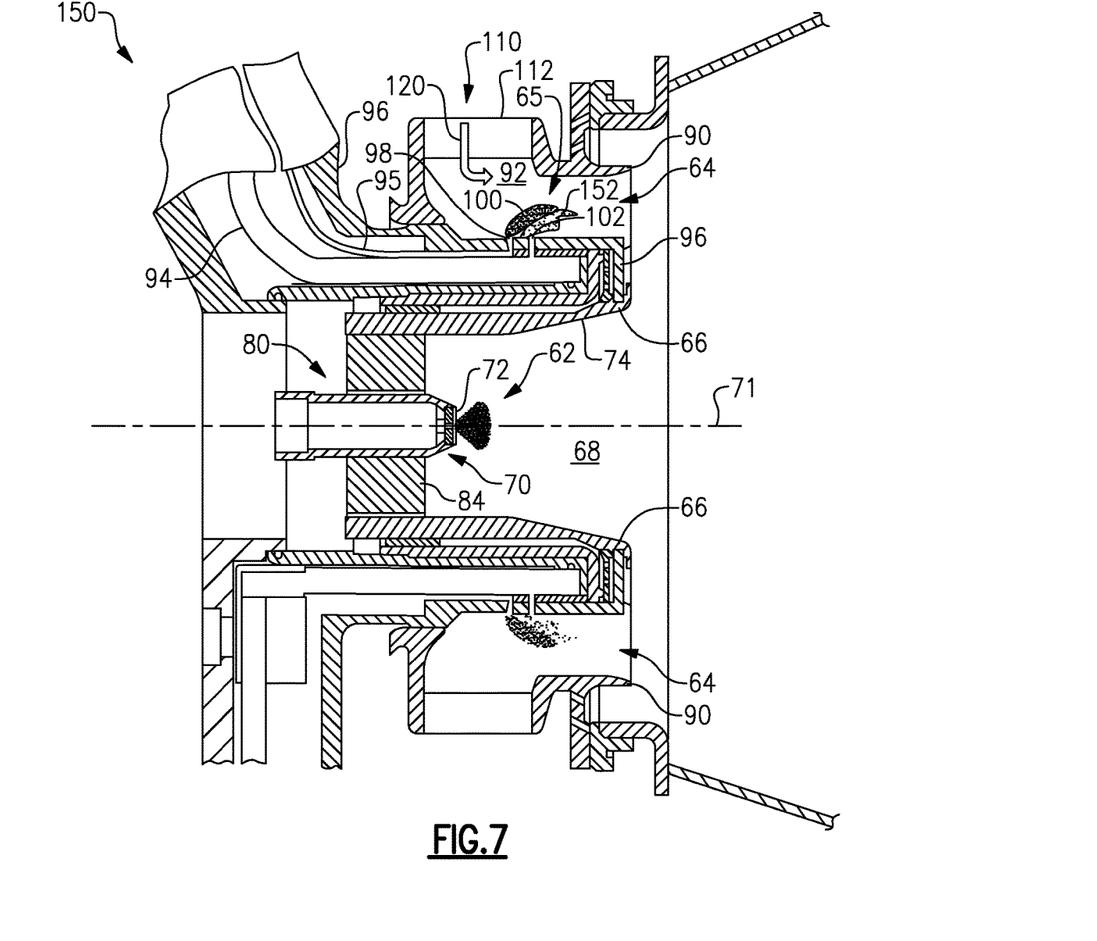
FIG. 7 is a simplified side cross-section view of an alternate embodiment of a mixer assembly including an air-shielded fuel injection assembly, according to one or more embodiments disclosed herein.
Figure 8:
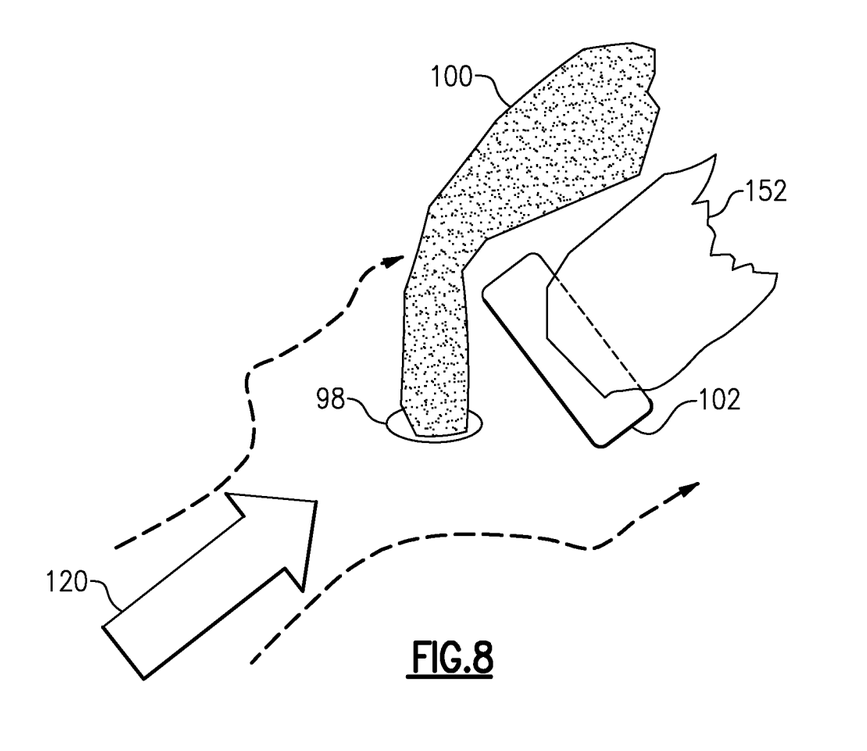
FIG. 8 is an enlarged simplified diagram illustrating the air-shielded fuel injection assembly of FIG. 7, according to one or more embodiments disclosed herein.

Referring now to FIGS. 7 and 8, illustrated is an alternate embodiment of the air-shielded fuel injection assembly to facilitate reduced $NO_x$ emissions in a combustor system, generally designated 150. Elements similar to those previously illustrated and described with regard to the first embodiment illustrated in FIGS. 3-6 are designated with identical numerals and are not further described. In the illustrated embodiment of FIGS. 7 and 8, the air manifold 95 includes a plurality of air injection ports 102 for introducing an air curtain 152 relative to each of the fuel injection columns 100 and into the cavity 92 of the main mixer 64. In contrast to the embodiment of FIGS. 3-6, in this particular embodiment, each of the plurality of air injection ports 102 is associated with one of the plurality of fuel injection ports 98 and configured downstream of the associated fuel injection port 98 to form a downstream curtain of air 152 relative to the fuel column 100 introduced via the associated fuel injection port 98. As previously indicated, the term "curtain" is used to indicate at least a partial "wrapping" of the injected air about the injected fuel column or injection of air relative to the injected fuel column in a manner so as to steer the trajectory of the injected fuel droplets. As will be understood by those skilled in the art, using fuel injection ports 98 and air injection ports 102 at different axial locations along the main mixer cavity 92 so as to provide for the formation of the downstream air curtain 152 relative to each of the fuel injection columns 100 enables the injected fuel to be kept away from a boundary layer, accelerates the flow of the injected fuel column 100, makes the fuel/air mixture lean and enables reduction in fuel accumulation along a center body of the downstream assembly.

As emissions regulations tighten, hardware known for lower emissions will become increasingly important. Research has shown that in large mixers, fuel jet penetration had a first order impact on $NO_x$ emissions. The benefit from increasing mixer effective area to allow in more air flow to reduce $NO_x$ depends on whether penetration was sufficient. By shaping and sizing the air injection port 102 so as to steer a trajectory of the fuel injection column 100 upward and/or in an axial downstream direction, as previously disclosed, improved mixing may be achieved. In addition, fuel drool and wetting (i.e., preventing liquid fuel droplets from landing on a metal center body) may be reduced, that in conjunction with a reduction in residence time, results in a reduction in fuel autoignition and/or flashback and subsequent flame holding in the boundary layer.

Accordingly, as disclosed herein and as illustrated in FIGS. 1-8 provided are various technological advantages and/or improvements over existing mixer assemblies and fuel injection. The disclosure provides an air-shielded fuel injection assembly to enhance the mixing of the fuel flowing from the fuel injector with air supplied via a swirler to the combustion chamber and thus reduces production of undesirable emissions such as oxides of nitrogen or $NO_x$. In addition, the air-shielded fuel injection column provides for the reduction in the risk of autoignition that may lead to improved durability of the hardware, and thereby a reduction in the need for maintenance or replacement. Another benefit of the disclosure is that the fuel-to-air ratio or volume of fuel divided by the volume of air profile at the fuel injector exit can be controlled so that the $NO_x$ performance can be optimized. As a result of the above, various embodiments of the present disclosure may allow extended combustor operating conditions, extend the life and/or maintenance intervals for various combustor components, maintain adequate design margins of flame holding, and/or reduce undesirable emissions. In addition, improved fuel-air mixing is also expected to yield better efficiency at a cruise condition.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The proposed mixer assembly including the proposed injector design improves fuel/air mixing (compared to current fuel injector products), which consequently improves combustion efficiency, lowers NO emissions and auto-ignition probabilities. In addition, in an embodiment the fuel injector provides wider operability, lower fuel pump pressure and increased durability. Advantageously, the fuel injector as disclosed herein requires less maintenance than known fuel injectors, results in a safer engine and weighs less than known fuel injectors, resulting in fuel cost savings.

Exemplary embodiments of an air-shielded fuel injector are described in detail above. The air-shielded fuel injectors are not limited to use with the specified turbine containing systems described herein, but rather, the air-shielded fuel injectors can be utilized independently and separately from other turbine containing system components described herein. Moreover, the present disclosure is not limited to the embodiments of the air-shielded fuel injectors described in detail above. Rather, other variations of the air-shielded fuel injector embodiments may be utilized within the spirit and scope of the claims.

While the disclosure has been described in terms of various specific embodiments, those skilled in the art will recognize that the disclosure can be practiced with modification within the spirit and scope of the claims.

What is claimed is:

1. An air-shielded fuel injection assembly for use in a combustion chamber of a turbine, the assembly comprising:
   a fuel manifold including a plurality of fuel injection ports, each fuel injection port configured to inject a fuel radially outward into an annular cavity of a mixer assembly to introduce a fuel injection column extending radially outward into the annular cavity; and
   an air manifold including a plurality of air injection ports, each air injection port formed upstream of an associated fuel injection port and wherein each air injection port is separated from the associated fuel injection port by a distance, each air injection port configured to inject a flow of air radially outward into the annular cavity of the mixer assembly and upstream of the plurality of fuel injection ports, to introduce an upstream air curtain extending radially outward into the annular cavity and upstream of an associated fuel injection column, to minimize recirculation of the fuel injection column and an upstream swirl crossflow and increase penetration of the fuel injection column into the annular cavity.

2. The air-shielded fuel injection assembly as claimed in claim 1, wherein the air-shielded fuel injection assembly is tunable to adjust fuel-air mixing in the assembly to achieve low $NO_x$ emissions.

3. The air-shielded fuel injection assembly as claimed in claim 1, wherein the fuel manifold is in fluid communication with a source of fuel and the air manifold is in fluid communication with a source of air.

4. The air-shielded fuel injection assembly as claimed in claim 1, wherein each of the plurality of air injection ports has a contoured configuration to inject the upstream curtain of air relative to an associated fuel injection column.

5. The air-shielded fuel injection assembly as claimed in claim 1, wherein each of the plurality of air injection ports has a substantially rectangular configuration.

6. The air-shielded fuel injection assembly as claimed in claim 1, wherein a center of each air injection port is aligned with a center of the associated fuel injection port along a vector forming a flow angle of a fuel trajectory in the fuel injection column introduced by the fuel injection port.

7. A mixer assembly for use in a combustion chamber of a turbine engine, the assembly comprising:
   a mixer including a main housing and defining an annular cavity;
   an air-shielded fuel injection assembly in fluid communication with the annular cavity, the air-shielded fuel injection assembly comprising:
      a plurality of fuel injection ports, each fuel injection port configured to inject a fuel radially outward into the annular cavity to introduce a fuel column extending radially outward into the annular cavity; and
      a plurality of air injection ports, each air injection port formed upstream of an associated fuel injection port and wherein each air injection port is separated from the associated fuel injection port by a distance, each air injection port configured to inject a flow of air radially outward into the annular cavity and upstream of the plurality of fuel injection ports, to introduce an upstream air curtain extending radially outward into the annular cavity and upstream of an associated fuel injection column, and
   a swirler positioned upstream from the air-shielded fuel injection assembly and having a plurality of vanes for swirling air traveling through the swirler.

8. The mixer assembly as claimed in claim 7, wherein at least one of the plurality of fuel injection ports or the plurality of air injection ports is tunable to adjust fuel-air mixing in the assembly to achieve low $NO_x$ emissions.

9. The mixer assembly as claimed in claim 7, wherein the fuel manifold is in fluid communication with a source of fuel and the air manifold is in fluid communication with a source of air.

10. The mixer assembly as claimed in claim 7, wherein each of the plurality of air injection ports has a contoured configuration to inject an upstream curtain of air relative to an associated fuel injection column.

11. The mixer assembly as claimed in claim 7, wherein a center of each air injection port is aligned with a center of the associated fuel injection port along a vector forming a flow angle of the fuel trajectory in the fuel injection column introduced by the fuel injection port.

12. A turbine engine assembly comprising:
a compressor section;
a combustor section; and
a turbine section, wherein the compressor section, the combustor section and the turbine section are configured in a downstream axial flow relationship, the combustor section comprising:
a combustion chamber; and
a mixer assembly disposed in the combustion chamber, the mixer assembly comprising:
a mixer including a main housing and defining an annular cavity;
an air-shielded fuel injection assembly in fluid communication with the annular cavity, the air-shielded fuel injection assembly comprising:
a plurality of fuel injection ports, each fuel injection port configured to inject a fuel radially outward into the annular cavity to introduce a fuel column extending radially outward into the annular cavity; and
a plurality of air injection ports, each air injection port formed upstream of an associated fuel injection port and wherein each air injection port is separated from the associated fuel injection port by a distance, each air injection port configured to inject a flow of air radially outward into the annular cavity of the mixer assembly and upstream of the plurality of fuel injection ports, to introduce an upstream air curtain extending radially outward into the annular cavity and upstream of an associated fuel injection column introduced by an associated fuel injection port of the plurality of fuel injection ports; and
a swirler positioned upstream from the air-shielded fuel injection assembly and having a plurality of vanes for swirling air traveling through the swirler and provide an upstream swirl crossflow.

13. The assembly as claimed in claim 12, wherein each of the plurality of air injection ports has a contoured configuration to inject an upstream curtain of air wrapping at least partially about an associated fuel injection column.

14. The assembly as claimed in claim 12, wherein the assembly comprises a gas turbine engine.

* * * * *